United States Patent [19]

Lerner

[11] Patent Number: 4,833,641

[45] Date of Patent: May 23, 1989

[54] SYSTEM FOR NUMERICAL DESCRIPTION OF COMPUTER PROGRAM LOGIC

[76] Inventor: Moisey Lerner, 75 Rolling La., Needham, Mass. 02192

[21] Appl. No.: 43,549

[22] Filed: Apr. 28, 1987

[51] Int. Cl.$^4$ .......................... G06F 7/00; G06F 7/10; G06F 7/12; G06F 7/38

[52] U.S. Cl. ..................................... 364/900; 364/300

[58] Field of Search ... 364/200 MS File, 900 MS File, 364/300

[56] References Cited

U.S. PATENT DOCUMENTS

| | | | |
|---|---|---|---|
| 4,387,427 | 6/1983 | Cox et al. | 364/200 |
| 4,468,736 | 8/1984 | DeSantis et al. | 364/200 |
| 4,642,767 | 2/1987 | Lerner | 364/406 |
| 4,649,480 | 3/1987 | Ohki et al. | 364/200 |
| 4,683,549 | 7/1987 | Takaki | 364/900 |

Primary Examiner—Raulfe B. Zache
Assistant Examiner—Robert B. Harrell
Attorney, Agent, or Firm—Tomin Corporation

[57] ABSTRACT

Data processing for an improved description of the logical structure of a large computer programs supervises, implements and coordinates a collection of informational words numerically describing links between different individually numbered portions of the computer program. These portions are called logical parts. Each link represents a transfer of control from one logical part through its exit to the entrance of another logical part. Each informational word contains at least seven numbers; of which three numbers—a logical part number, an exit number, a program line number of the exit—describing the exit of one logical part, the other three numbers describing the entrance of the linked logical part, and the last number describing the location of the informational word in the collection. A search of informational words of the collection is performed to provide a hard copy printouts of informational words in different sequences and combinations, creating a set of lists of informational words numerically describing the logical structure of a computer program, and substituting conventional graphical descriptions of the logical structure. Whenever a program is modified to the extent which effects the logical structure, the corresponding informational words of the collection are amended and a new daughter collection is created, which is used to printout a new set of lists of informational words describing the new logical structure. A program map based on the numerical description of the logical structure is used to specify amendments of informational words. The numerical description of the logical structure helps to easily read and modify a computer program of any size and complexity.

21 Claims, 7 Drawing Sheets

SYSTEM FOR NUMERICAL DESCRIPTION OF COMPUTER PROGRAM LOGIC

BACKGROUND OF THE INVENTION

1. Field of the Invention.

The invention relates to designing, reading and modifying large computer programs, and more specifically, to data processing methodology and apparatus for effecting an improved numerical description of the logical structure of a large computer program.

2. Description of the Invention.

A large computer program written in non-structured languages, like COBOL, FORTRAN, BASIC, etc., degenerates after years of enhancements into a coding hodgepodge with a complicated internal structure. Having invested millions, or sometimes tens of millions of dollars in such programs, many corporate information managers are interested to keep patching the programs as needs arise than junk them. It was believed by many program designers that little can be done to make these programs easy to read, easy to amend, to say nothing about reusing a program. The main attention of software engineering has been focused on production of new programs.

We address in this invention the problems of already existing programs. Clarifying internal structure of a large computer program with the help of external means (i.e. without changing the program code) is the main goal of this invention.

SUMMARY OF THE INVENTION

It is an object of this invention to provide an improved system for describing, designing and modifying the logical structure of a large computer program, which may be composed of a number of individual programs.

More specifically, it is an object of this invention to provide a data processing implementation, which creates a collection of informational words, numerically describing interrelations (links) between different individually numbered portions of a large computer program, said portions being called "logical parts", each link representing a transfer of control from one logical part through its port, being called "exit", to the port of another logical part, said port being called "entrance", each informational word containing at least seven numbers, of which three numbers-a logical part number, an exit number, a program line number of the exit-describing the exit of one logical part, the other three numbers describing the entrance of the linked logical part, the seventh number describing the location of said informational word in the collection; which performs a search of informational words of said collection to provide hard copy printouts of informational words in different sequences and combinations creating a set of lists of informational words numerically describing the logical structure of a computer program, having the power of substituting conventional graphical description of said logical structure; which provides amendments of informational words of said collection, said amendments following every new modification of a computer program, which effects the structure of said program, said amendments after having been introduced into said collection creating a daughter collection of informational words, said daughter collection being used to create a new set of lists of informational words describing the new logical structure of a computer program; which provides a documentation for revising the history of changes of computer logic, said documentation containing lists of all amended informational words before and after amendment and lists of all parent collections of informational words.

The above and other objects of the present invention are realized in a specific illustrative low price system for designing interrelations within a computer program, said system referred to hereinafter as a "machine", based on a "Commodore TM" computer with a minimum size of computer memory, e.g. 16 kilobytes, since the system needs just several kilobytes to operate.

According to the invention a machine for designing logical structure has an input device to receive a collection of informationl words, numerically describing links between different portions of the computer program. Each of these portions performs at least one function and said portion is called "logical part". Each link represents a transfer of control of data processing action from one logical part through its port, called "exit", to the port of another logical part, said port, called "entrance". Each informational word contains at least seven numbers, three of which-a logical part number, an exit number, a program line number of the exit-being attributes of the exit of one logical part, the other three of said seven numbers being attributes of the entrance of the linked logical part.

According to the invention the machine has a processing unit, which memorizes the parent collection after it was entered through the input device. Said processing unit has an algorithm performing a search of informational words by the attributes of a logical part.

The machine also has an output device providing a hard copy printout of informational words arranged in consecutive order of the numbers of logical parts. Another hard copy printout provides informational words arranged in consecutive order of program line number corresponding to the entrance of logical parts. The set of three printouts constitutes a numerical description of the logical structure of a computer program. Said numerical description has the power of substituting conventional graphical representation of the logical structure, such as flow-chart, data-flow, etc.

A great advantage of the numerical description of the logical structure, however, is in the simplicity of amending said description whenever a program is modified to the extent that it effects the logical structure of the program. In order to introduce amendments, the machine has another input device, such as a keyboard, which is used to enter the amended attributes of the informational word already present in said collection, or to enter attributes of the new informational word to be added to said collection. According to the invention the machine has another output device for screen printout of those informational words of the collection which have the same logical part number as the one which is entered as the attribute of the amendment. Said function of the machine is needed whenever the designer wants to verify whether a particular amendment has already been entered into the collection. The amended collection becomes a daughter collection, whereas the collection before entering amendments becomes a parent collection.

The machine has an output memory storage device for storing the daughter collection which is then used to create a new set of printed out documents numerically describing the new logical structure of the computer program.

Another advantage of the machine is providing comprehensive documentation for revising history of changes of the logical structure of a program during the whole period of development of the computer program since the conception of the program, said documentation being at the same time very concise in volume. In order to provide said documentation the processing unit of the machine performs a search of informational words of the parent collection after the attributes of the amended informational word is entered into the machine through a keyboard, the machine then prints out a hardcopy of the amended informational word before and after said amendment, creating a list of amended informational words. The machine also prints out a hardcopy of all informational words in consecutive order of their location in the collection; creating a hardcopy of the collection. The sets of all lists of entered amendments, and of all lists of collections of informational words, created after each amendment, constitute a concise history of the program development. There is no need therefore for keeping those lists of printout of informational words which describe the logic of a computer program, except the last set, or may be the last two sets. All other sets describing different modifications of the logic and occupying a lot of physical volume may be discarded.

Still another advantage of the machine is the economical implementation of a computer memory for performing the forgoing functions of the machine irrespective to the size of the collection of informational words. This goal is achieved by keeping in the operating memory of the machine a batch of informational words containing at least one informational word, said batch being saved in the memory storage device, including magnetic tape, disk, etc. The size of the batch depends on the size of of the operating memory available for the purposes of designing the logical structure, the whole collection of informational words being handled as a sequence of said batches, the number of batches depending on the size of the collection.

In the preferred embodiment of this invention the printout of the collection of informational words describing input-output (entrance-exit) environment for each considered logical part is performed on a separate page (or pages) and is complemented by the portion of the computer program, with all commands belonging to this logical part so that said separate page (or pages) fully describes (or describe) the logical part itself as well as the interrelation of this logical part with other logical parts. The loose-leaf descriptions of individual logical parts are then combined into a book following the orderly, (preferably in numerical order) succession of part numbers so that each page describing a logical part with a certain number follows the page describing the logical part with the preceding number; said book providing a comprehensive description of the program including interrelations between the logical parts of said program.

In another preferred embodiment of this invention the printouts of collection of informational words is organized in scrolls, where their description of input-output (entrance-exit) environment of one logical part is immediately followed by the input-output (entrance-exit) environment of the consecutive logical part. One of the advantages of said organization of a large logical program is the simplicity of introducing changes into the system, keeping track of mode changes.

BRIEF DESCRIPTION OF THE DRAWINGS

The foregoing and additional features and advantages of this invention will become more easily understood from the following description of illustrative embodiment thereof taken into conjunction with the accompanying drawings in which.

DESCRIPTION OF THE PREFERRED EMBODIMENTS

Figure 1:
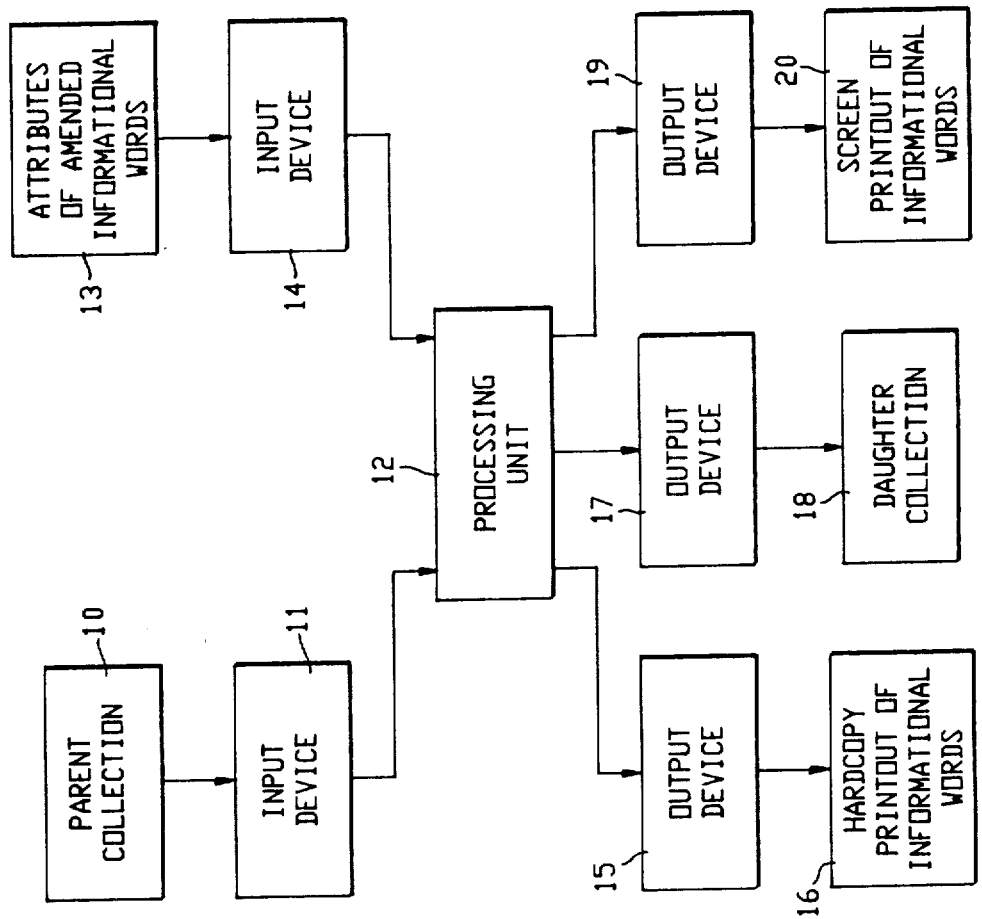
FIG. 1 is a schematic block diagram which represents the invented method and the machine for designing the logical structure of a computer program.

Referring now to FIG. 1, there is shown an illustration of one of the principles of the invention. A parent collection of informational words (10) numerically describing links within a computer program, said collection being stored on a magnetic tape and also on other available informational storage means, is entered into the processing unit (12) with the help of one of the input devices (11). The input device may be a tape recorder, or a disk drive, or other information storage means. Functioning of the processing unit (12) is controlled by a program, the flow chart of which is shown in FIG. 2A.

Figure 2A:
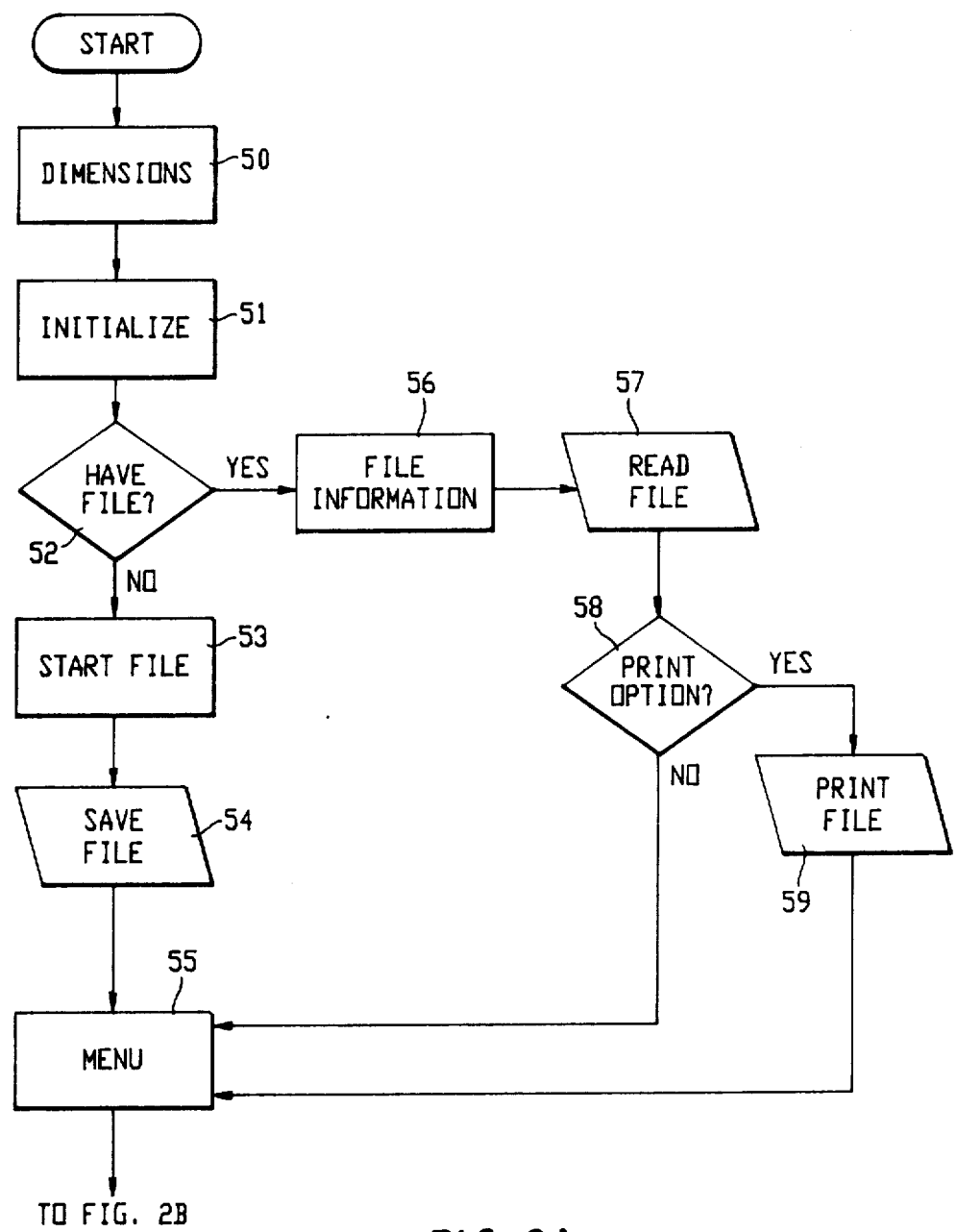
FIG. 2A, 2B, 2C, and 2D are respectively portions of a schematic flow chart of a program, which controls functioning of the processing unit according to the methodology of the present invention.

Beginning at the top of FIG. 2A the program starts with declaring in functional block 50 the dimensions of variables used in the program. The variables are then initialized in the next functional block 51, after which control over data processing is transferred to decision block 52, which inquires whether a parent file exists. "NO" output brings to functional block 53, where a file starts and then is saved on a magnetic storage device in functional block 54, arriving subsequently at the program menu (functional block 55). "YES" output of the "HAVE FILE?" decision block 52 transfers control to functional block 56, which inquires information about the parent file, said file containing collection of informational words. The parent file is read in functional block 57.

The parent collection of informational words may be like the following one, which represents the first 7 lines of said collection:

| 950 | 100 | 1 | 50 | 101 | 0 |
|---|---|---|---|---|---|
| 70 | 101 | 1 | 250 | 102 | 0 |
| 275 | 102 | 1 | 1000 | 103 | 0 |
| 1005 | 103 | 1 | 1100 | 104 | 0 |
| 1010 | 103 | 2 | 1200 | 105 | 0 |
| 1015 | 103 | 3 | 1300 | 106 | 0 |
| 1020 | 103 | 4 | 1400 | 107 | 0 |

All data of this collection represent logical links between different individually numbered portions of a computer program. For illustrative purposes we will consider an example of a portion of a computer program performing bookkeeping and accounting functions, according to the principles of the U.S. Pat. No. 4,642,767 granted to me on Feb. 10, 1987.

The first three data (950 100 1) of said collection describe a port of the portion of said computer program, said port having number (1), which indicates that the port is exit 1, said exit being located on the program line number 950, and said portion of the program having number 100 which indicates that it belongs to a logical part 100. The following three numbers (50 101 0) describe the port of another portion of said computer program, said port having number (0) which indicates that it is an entrance of the part, said entrance located on the program line 50, and said portion of the program being identified as the logical part 101. All six first numbers form an informational word. The fist word in this collection is remembered as the number 1 informational word. Said word describes the transfer of control of data processing activity from exit 1 of logical part 100 to the logical part 101.

The second set of six numbers (70 101 1 250 102 0) form the informational word 2, which describes the transfer of control of data processing activity from the exit 1 of logical part 101 to logical part 102.

Each logical part of said parent collection can, besides its number, be additionally identified by a name, preferably in the abbreviated form, which describes at least one function of said logical part. For instance, the logical part 100 performs the function of specifying dimensions of the variables used in the program. Said logical part is therefore additionally identified by the name DIMENS (abbreviation for DIMENSIONS) which, for instance, follows the number of the port of said logical part. The logical part 101 performs the function of initializing (zeroing) variables. Said logical part is additionally identified by the name INITIAL (abbreviation for INITIALIZING). In this case the collection of informational words will become the following one, in which other logical part names are also indicated:

| 950 | 100 | 1 | DIMENS | 50 | 101 | 0 | INITIAL |
| 70 | 101 | 1 | INITIAL | 250 | 102 | 0 | MODE MENU |
| 275 | 102 | 1 | MODE MENU | 1000 | 103 | 0 | SELECTOR |
| 1005 | 103 | 1 | SELECTOR | 1100 | 104 | 0 | UPDATING |
| 1010 | 103 | 2 | SELECTOR | 1200 | 105 | 0 | LISTING |
| 1015 | 103 | 3 | SELECTOR | 1300 | 106 | 0 | COPYING |
| 1020 | 103 | 4 | SELECTOR | 1400 | 107 | 0 | STARTING |

In another embodiment of this invention each name is identified by the number by which it is listed in the library of names describing function of logical parts. In this case a collection of informational words would consist of numbers only.

Logical parts of the program described by the abovementioned collection of informational words are distinguished by the feature, that each of them transfers control of data processing action through its exit to the other portions of the program without ever receiving said control back to the particular exit, wherefrom the control was transferred. Ordinarily said non-returning transfer of control is performed in high-level computer languages by a command GOTO. A logical part characterized by said type of transfer of control is called here "logical unit". In other words a logical unit is a logical part in which no one of the outputs (exits) coincides with the input (entrance) of said part. Logical units are identified here by numbers starting from 100 and up.

A computer program can contain a logical part, characterized by the feature that said logical part eventually returns control of the data processing action back to a particular exit of another logical part wherefrom this control was transferred to said logical part. Said logical part is called here SUBROUTINE. In other words, a subroutine is a logical part in which one of the outputs (exits) coincides with the input (entrance) transferring the control back wherefrom the control was received. Subroutines are identified here by numbers starting from 500 and up. An informational word containing a subroutine looks like the following one:

| 1115 | 104 | 1 | UPDATING | 1500 | 500 | 0 | PARENT INF |

This informational word stands for the following statement: exit (output) 1, located on the program line 1115, transfers control of data processing action from logical part 104, named UPDATING to subroutine 500, named PARENT INF (INFORMATION) through the entrance 0, located on the program line 1500, and after performing a data processing action the control is transferred back to the exit 1 of the part 104. Ordinarily said transfer of control back to the exit is performed in high-level computer languages by the command RETURN, coupled with initial transfer of control to the subroutine by a command GOSUB, CALL, etc.

FIG. 1 illustrates another principle of the present invention. All informational words, which were entered as a parent collection and stored in the operating memory of the processing unit (12), can then be printed out with the help of a special algorithm of the processing unit (12) and of the output device (15) to obtain a hardcopy of the collection of informational words in consecutive order of their location in the memory. This algorithm is reflected in the flow chart of FIG. 2A with the decision block 58, called PRINT OPTION. The "YES" output of this block brings to functional block 59, performing the file printout function. Said printout we will call here DOCUMENT 1 and it can be as the following one:

| DOCUMENT 1 | | | | | | | | |
|---|---|---|---|---|---|---|---|---|
| Program line | Unit/ SUB | Exit/ Entr | Name | Program line | Unit/ Sub | Exit/ Entr | Name | Memory # |
| 950 | 100 | 1 | DIMENS | 50 | 101 | 0 | INITIAL | 1 |
| 70 | 101 | 1 | INITIAL | 250 | 102 | 0 | MODE MENU | 2 |
| 275 | 102 | 1 | MODE MENU | 1000 | 103 | 0 | SELECTOR | 3 |
| 1005 | 103 | 1 | SELECTOR | 1100 | 104 | 0 | UPDATING | 4 |
| 1010 | 103 | 2 | SELECTOR | 1200 | 105 | 0 | LISTING | 5 |
| 1015 | 103 | 3 | SELECTOR | 1300 | 106 | 0 | COPYING | 6 |
| 1020 | 103 | 4 | SELECTOR | 1400 | 107 | 0 | STARTING | 7 |
| 900 | 100 | 0 | DIMENS | 5 | 115 | 1 | RUN | 8 |

-continued

| DOCUMENT 1 | | | | | | | | |
|---|---|---|---|---|---|---|---|---|
| Program line | Unit/ SUB | Exit/ Entr | Name | Program line | Unit/ Sub | Exit/ Entr | Name | Memory # |
| 1115 | 104 | 1 | UPDATING | 1500 | 500 | 0 | PARENT INF | 9 |
| 1120 | 104 | 2 | UPDATING | 9110 | 550 | 0 | PRINT INF | 10 |
| 1130 | 104 | 3 | UPDATING | 3000 | 501 | 0 | READ PARENT | 11 |
| 1140 | 104 | 4 | UPDATING | 1600 | 108 | 0 | DAUGTR FILE | 12 |

As it can be seen from this illustration, each informational word is characterized by the number of its location in the computer memory, said number being called here MEMORY NUMBER. Memory number is an additional attribute of an informational word, which, however, is virtual, belonging to this particular collection. All other attributes of an informational word, such as logical part number, port number, line number of the port, and part name, do not depend on the location of the particular informational word in the collection. Said particular word can occupy different locations in the collection before and after modification which is discussed below.

As it can also be seen from DOCUMENT 1, an informational word does not necessarily starts with the attributes of the logical part wherefrom the control of data processing action is transferred-the first four attributes can belong to the logical part to which the control is transferred, as in the case of the informational word having memory 8.

Figure 2B:
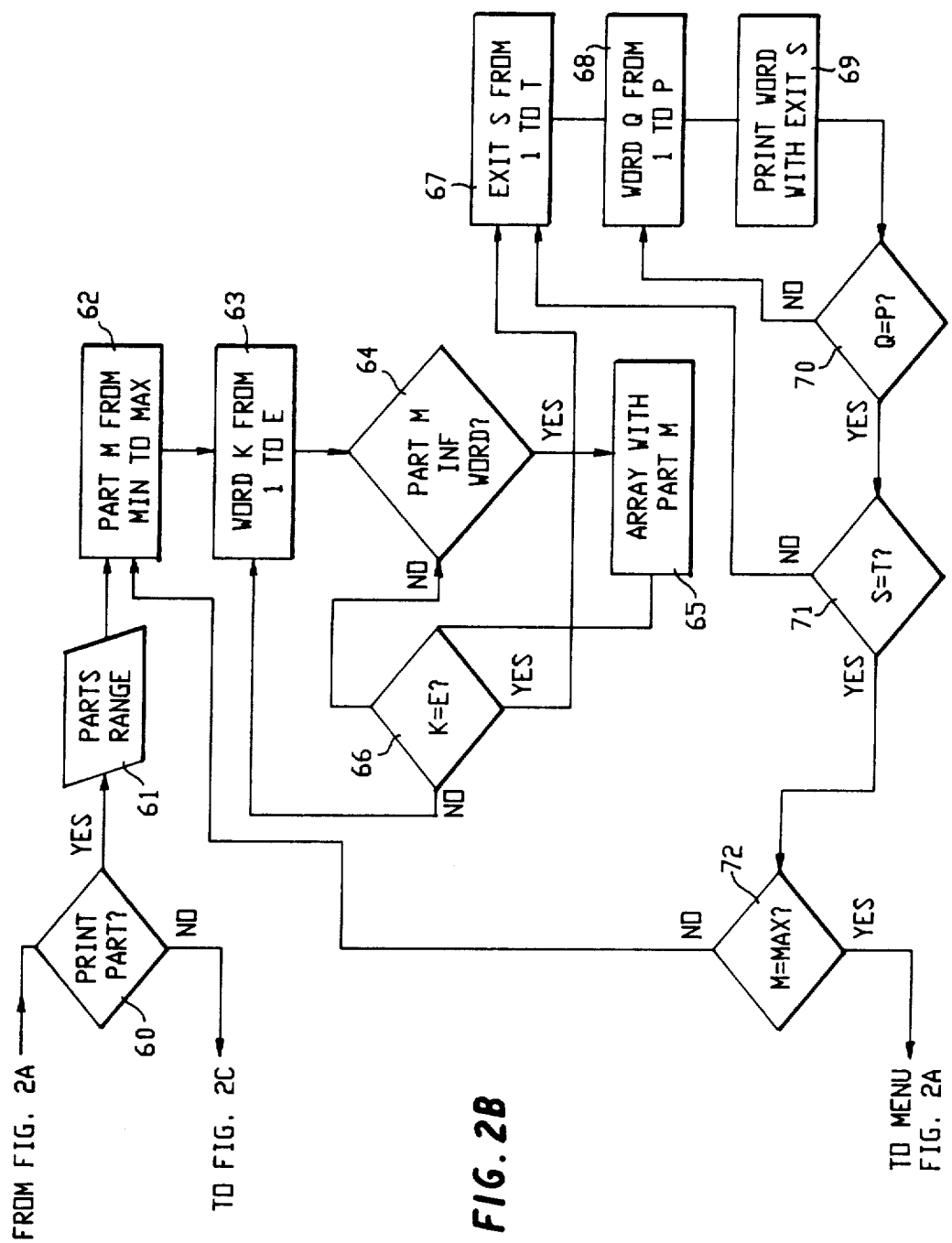

FIG. 1 illustrates the third principle of the invention, that is, providing hardcopies of informational words, organized in different sequences and combinations in such a manner that a set of said printouts can describe the logical structure of computer program so, that this description substitutes the conventional graphical description of the logical structure, like flow-charts, dataflow, etc. In order to obtain said set of printouts the processing unit (12) has an algorithm for performing a search of informational words by a particular attribute. In this way a hardcopy printout of all informational words can be done in consecutive order of the numbers of logical units. This algorithm is reflected in the flow-chart of FIG. 2B with the decision block 60, called PRINT PART. The "YES" output of this block brings to a functional block 61, where information about the range of parts numbers is entered. Control is then transferred to a group of functional blocks, which perform a search of all informational words, in order to find those words which contain a particular part number M (see functional blocks 62, 63), then create an array which contains all informational words having part M (see functional blocks 64, 65, and 66). After the array is created, the decision block 66 transfers control through the "YES" output to a group of functional blocks 67 to 71, printing out informational words in the succession of exit numbers part M, starting with exit 1 (see functional block 69). Control now is transferred through the "YES" output of decision block 71 to decision block 72, which either transfers control to functional block 62, in order to make a printout of all informational words, containing a logical part with the next part number, said informational words being arranged in the succession of the exit numbers of said part. Or, when the printout of all parts is over, decision block 72 transfers control back to MENU (functional block 55 in FIG. 2A). This printout is called here DOCUMENT 2 and can be as the following one:

| DOCUMENT 2 | | | | | | | | |
|---|---|---|---|---|---|---|---|---|
| Program line | Unit/ SUB | Exit/ Entr | Name | Program line | Unit/ Sub | Exit/ Entr | Name | Memory # |
| 950 | 100 | 1 | DIMENS | 50 | 101 | 0 | INITIAL | 1 |
| 900 | 100 | 0 | DIMENS | 5 | 115 | 1 | RUN | 8 |
| 50 | 101 | 0 | INITIAL | 950 | 100 | 1 | DIMENS | 1 |
| 70 | 101 | 1 | INITIAL | 250 | 102 | 0 | MODE MENU | 2 |
| 250 | 102 | 0 | MODE MENU | 70 | 101 | 1 | INITIAL | 2 |
| 275 | 102 | 1 | MODE MENU | 1000 | 103 | 0 | SELECTOR | 3 |
| 1000 | 103 | 0 | SELECTOR | 275 | 102 | 1 | MODE MENU | 3 |
| 1005 | 103 | 1 | SELECTOR | 1100 | 104 | 0 | UPDATING | 4 |
| 1010 | 103 | 2 | SELECTOR | 1200 | 105 | 0 | LISTING | 5 |
| 1015 | 103 | 3 | SELECTOR | 1300 | 106 | 0 | COPYING | 6 |
| 1020 | 103 | 4 | SELECTOR | 1400 | 107 | 0 | STARTING | 7 |
| 1100 | 104 | 0 | UPDATING | 1005 | 103 | 1 | SELECTOR | 4 |
| 1115 | 104 | 1 | UPDATING | 1500 | 500 | 0 | PARENT INF | 9 |
| 1120 | 104 | 2 | UPDATING | 9110 | 550 | 0 | PRINT INF | 10 |
| 1130 | 104 | 3 | UPDATING | 3000 | 501 | 0 | READ PRNT FILE | 11 |
| 1140 | 104 | 4 | UPDATING | 1600 | 108 | 0 | DAUGHTER FILE | 12 |

As it can be seen from this illustration, Document 2 provides a comprehensive description of all links within the program for each particular logical part, describing the entrance and all exits.

Another hardcopy printout of informational words in consecutive order of the numbers of subroutines is called "DOCUMENT 3" and it can be as the following one:

| DOCUMENT 3 | | | | | | | | |
|---|---|---|---|---|---|---|---|---|
| Program line | Unit/ SUB | Exit/ Entr | Name | Program line | Unit/ Sub | Exit/ Entr | Name | Memory # |
| 1500 | 500 | 0 | PARENT INF | 1115 | 104 | 1 | UPDATING | 9 |
| 3000 | 501 | 0 | READ PRNT FILE | 1130 | 104 | 3 | UPDATING | 11 |

-continued

DOCUMENT 3

| Program line | Unit/ SUB | Exit/ Entr | Name | Program line | Unit/ Sub | Exit/ Entr | Name | Memory # |
|---|---|---|---|---|---|---|---|---|
| 3000 | 501 | 0 | READ PRNT FILE | 95 | 136 | 3 | 'CREATE REF | 266 |
| 3000 | 501 | 0 | READ PRNT FILE | 2715 | 528 | 4 | READ LISTING | 415 |

Doucment 3, as it can be seen from this illustration provides the logical parts environment for each particular subroutine, showing all links with any other parts of the computer program.

Figure 2C:
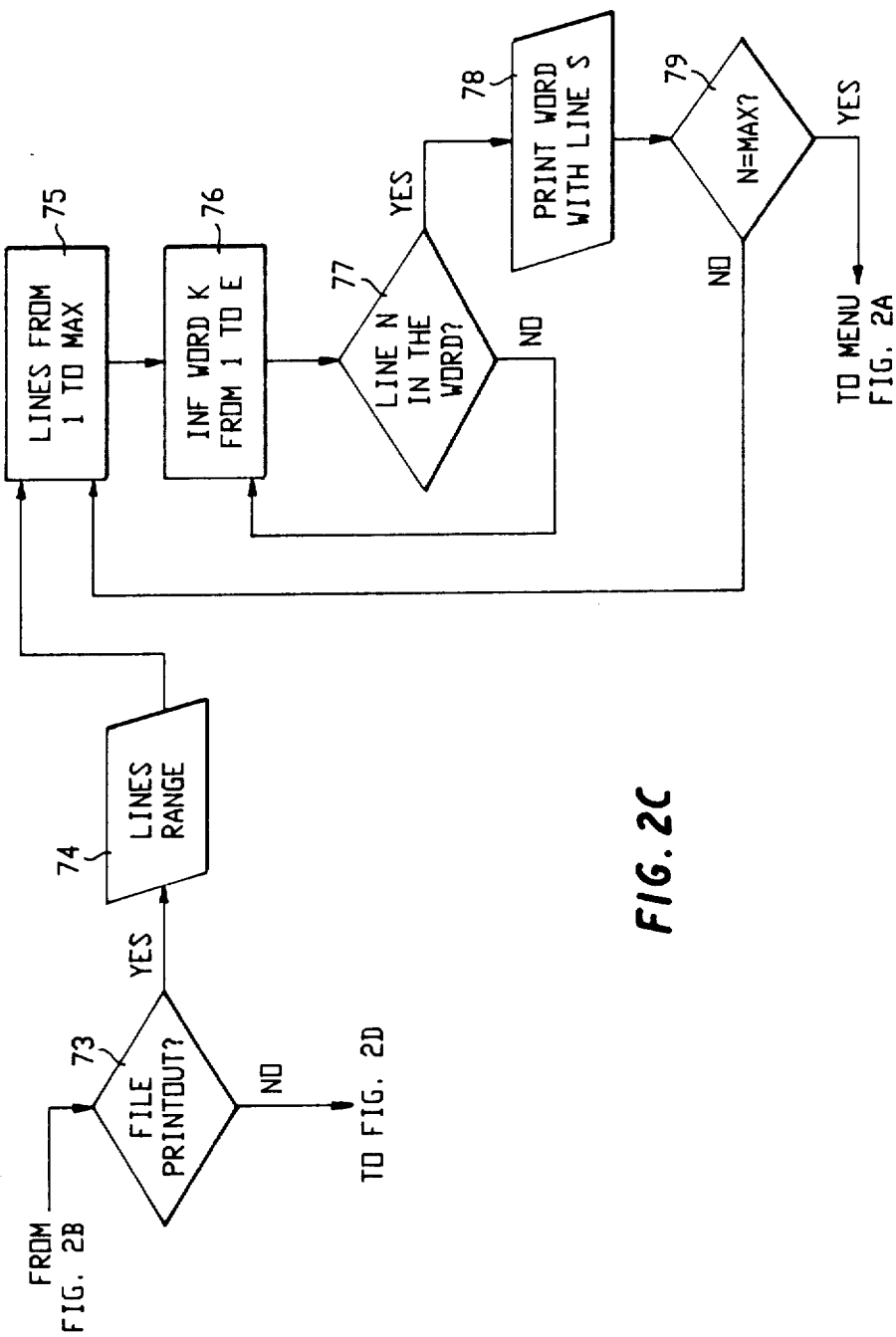

Document 3, and 3 essentially constitute a set of hardcopy printouts which has the power of substituting conventional graphical description of the logical structure such as the flow-chart, data-flow, etc. It is convenient, however, to complement this set with an additional printout of informational words organized in consecutive order of line numbers of entrances of logical parts. This type of printout is controlled by a group of functional blocks 73 to 79 in FIG. 2C. In particular, when the decision block 73 transfers control to functional block 79, information about the range of program lines is entered. A search of all informational words begins with block 75 and an informational word with a consecutive line number is printed out in functional block 78 with the help of a nested loop, created by blocks 75, 76, 77, and 79. This printout is called here Document 4 and it can be as the following one:

ever the programmer is concerned with nondisclosure of the logical structure of the program to an unauthorized eye.

A set of DOCUMENTS 2,3 and 4 printed out in a scroll form in combination with a scroll printout of the computer program corresponding to said set, constitutes a comprehensive means for easy reading and understanding the program irrespective to its size and complexity.

In another embodiment of the invention, the machine of FIG. 1 provides a "loose-leaf" organization of the set of DOCUMENTS 2 and 3. In said organization the informational words belonging to a particular logical part are printed out on at least one separate page, or pages, immediately followed by the printout of the portion of the program belonging to said particular logical part. The example below illustrates said type of organization for the considered above bookkeeping and accounting program.

| Program line | Unit/ SUB | Exit/ Entr | Name | Program line | Unit/ Sub | Exit/ Entr | Name | Memory # |
|---|---|---|---|---|---|---|---|---|
| 1000 | 103 | 0 | SELECTOR | 275 | 102 | 1 | MODE MENU | 3 |
| 1005 | 103 | 1 | SELECTOR | 1100 | 104 | 0 | UPDATING | 4 |
| 1010 | 103 | 2 | SELECTOR | 1200 | 105 | 0 | LISTING | 5 |
| 1015 | 103 | 3 | SELECTOR | 1300 | 106 | 0 | COPYING | 6 |
| 1020 | 103 | 4 | SELECTOR | 1400 | 107 | 0 | STARTING | 7 |
| 1000 | | | REM *** 103 SELECTOR *** | | | | | |
| 1005 | | | IF K = 1 GOTO 1100 | | | | | |
| 1010 | | | IF K = 2 GOTO 1200 | | | | | |
| 1015 | | | IF K = 3 GOTO 1300 | | | | | |
| 1020 | | | IF K = 4 GOTO 1400 | | | | | |

The printout of the portion of the program in this illustration can be performed automatically if the col-

DOCUMENT 4

| Program line | Unit/ SUB | Exit/ Entr | Name | Program line | Unit/ Sub | Exit/ Entr | Name | Memory # |
|---|---|---|---|---|---|---|---|---|
| 50 | 101 | 0 | INITIAL | 1600 | 100 | 1 | DIMENS | 1 |
| 250 | 102 | 0 | MODE MENU | 70 | 101 | 1 | INITIAL | 2 |
| 900 | 100 | 0 | DIMENS | 5 | 115 | 1 | RUN | 8 |
| 1000 | 103 | 0 | SELECTOR | 275 | 102 | 1 | MODE MENU | 3 |
| 1100 | 104 | 0 | UPDATING | 1005 | 103 | 1 | SELECTOR | 4 |
| 1200 | 105 | 0 | LISTING | 1010 | 103 | 2 | SELECTOR | 5 |
| 1300 | 106 | 0 | COPYING | 1015 | 103 | 3 | SELECTOR | 6 |
| 1400 | 107 | 0 | STARTING | 1020 | 103 | 4 | SELECTOR | 7 |
| 1500 | 500 | 0 | PARENT INF | 1115 | 104 | 1 | UPDATING | 9 |
| 1600 | 108 | 0 | DAUGHTER FILE | 1140 | 104 | 4 | UPDATING | 12 |

Document 4 is helpful whenever there is a need to identify, which logical part a particular program line, or a portion of the program, belongs to. While DOCUMENTS 2 and 3 provide the route "from logical structure to computer program", the DOCUMENT 4 provides the opposite route "from computer program to logical structure". It is possible, instead, or in addition to DOCUMENT 4, to use a program line with a REMARK (REM) statement at the beginning of each logical part within the computer program, said statement containing the number and, optionally, the name of the logical part. This way however, can not be used whenlection of informational words is incorporated into the program, which the collection describes. Or it can be done manually by cutting the hardcopy printout of the computer program into portions, each portion starting with the entrance (input) of the logical part and ending at the last exit (output) of said logical part, or the last RETURN command, if said logical part is a subroutine.

The invented machine and method allow to easily read and understand the program using numerical description of its structure with the help of a set of DOCUMENTS 2,3 and 4. The invention allows also to easily modify the program and its structure, providing a concise and comprehensive description of modifications.

Whenever a portion of a program is modified to the extent that said modification effects the logical structure of a particular logical part, to which said portion of the program belongs, the logical environment of said particular logical part is described with the help of a program map, created from DOCUMENTS 2 and 3.

Suppose for instance, that the portion of the program, which belongs to the logical part 103, is the one shown in the above illustration of the loose-leaf organization of DOCUMENT 3. Suppose we modify said portion of the program to include an additional exit on the line 1017 transferring the control of data processing action to another part (having number 125 and named JOURNAL SEARCH) through its entrance located on the program line 2620.

| PROGRAM | PROGRAM AMENDMENT |
|---|---|
| 1000 REM *** 103 SELECTOR *** | |
| 1005 IF K = 1 GOTO 1100 | |
| 1010 IF K = 2 GOTO 1200 | |
| 1015 IF K = 3 GOTO 1300 | |
| 1020 IF K = 4 GOTO 1400 | |
| enter: | 1017 IF K = 5 GOTO 2620 |

Figure 3:
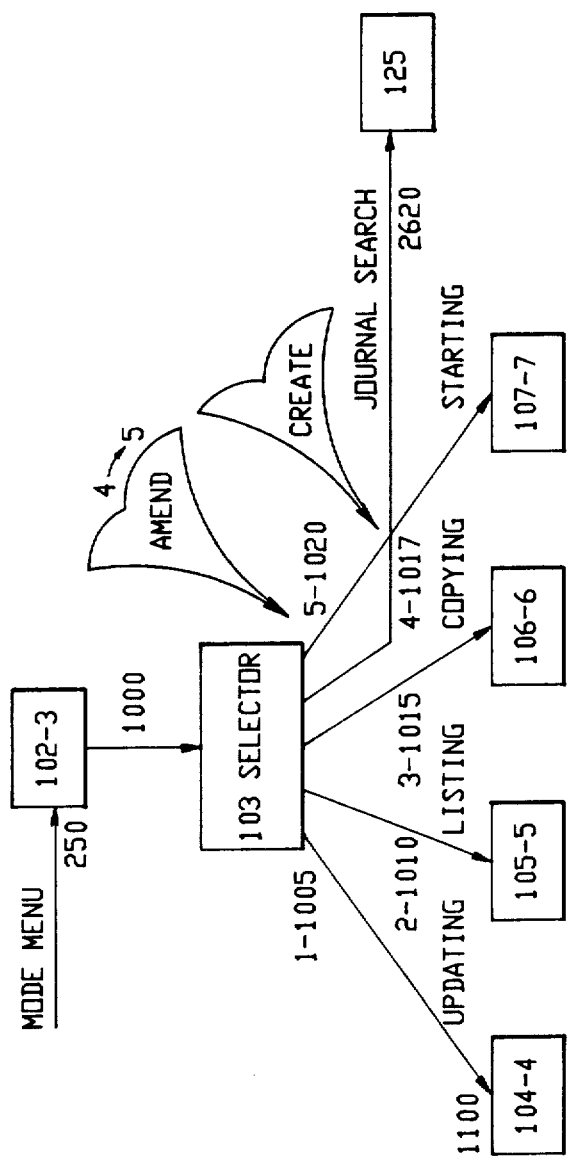
FIG. 3 is a schematic program map, which represents a graphical description according to this invention of an amendment of the logical structure, which followed the modification of a portion of a computer program.

In order to identify amendments which should be introduced into the logical structure, and into the program, a program map graphically describing the logical environment of part 103 is created in the preferred embodiment of this invention. The program map of the logical part 103 showing logical links and identifying their amendments is illustrated in FIG. 3. The program map of FIG. 3 was created from the information gathered in DOCUMENT 2: the number of each logical part is indicated in a separate rectangular block, the link of a particular logical part with another logical part is shown with the help of a line issuing from a particular exit of said part; the number of said exit and the program line number of said exit are shown preferably over the line close to the point of issuance of the line; said line ending at the entrance of a linking logical part, the program line number of said entrance being indicated over the line, the name of said other logical part being indicated along and under the line. Each block contains the number of logical part and through a dash the number of the informational word in the collection. The block of logical part 103, for which the logical map is created, may not contain a specific memory number. It may include, however, the name of the part in the block in order to distinguish this central part from all the others.

When a program map describing the status of the structure of the program before amendment is drawn, the amendment is indicated by a new line which describes a new exit 4 located on the program line 1017 preceding the former exit 4 on the line 1020. It means that two amendments should be introduced into the present collection of informational words. The first one adds a new informational word to the collection, said word describing the transfer of control from the exit on the program line 1017, which is the new exit 4 of part 103 to the entrance of the logical part 125. The new informational word will have therefore the following format:

| 1017 | 103 | 4 | 2620 | 125 | 0 | JOURNAL SEARCH. |
|---|---|---|---|---|---|---|

The second amendment changes the exit number from 4 to 5 in the informational word which describes the link between logical parts 103 and 107 before the amendment. As it follows from DOCUMENT 2 and as it is shown in the block of part 107 the number of said informational word is 7.

These two amendments are identified on the program map of FIG. 3 with the help of arrows, showing the type of the amendment: CREATE-for part 125, AMEND-for part 107. In case any link was deleted during amendment the word DELETE is indicated inside the arrow. If an informational word is amended it is also preferred to indicate close to, or within, the arrow the specific attribute of the word which should be changed (exit 4 to 5 in the considered case).

The amendments graphically indicate on the program map with the help of arrows are also described in the following preferred form:

| ACTION | MEM # | UNIT/SUB | DESCRIPTION of AMENDMENT | | | | REMARK |
|---|---|---|---|---|---|---|---|
| CREATE | | 125 | 1017 | 103 | 4 | SELECTOR | |
| | | | 2620 | 125 | 0 | JOURNAL SEARCH | |
| AMEND | | | | | | | |
| DELETE | | | | | | | |
| CREATE | | | | | | | |
| AMEND | 7 | 107 | 4→5 | | | | |
| DELETE | | | | | | | |

When the program map, graphically describing the logical environment of a particular logical part before and after amendments, is combined with the portion of the amended program, and with the description of the amendment to be entered into the machine, then a new document is created. We will call said document here as WORKING DOCUMENT.

Figure 2D:
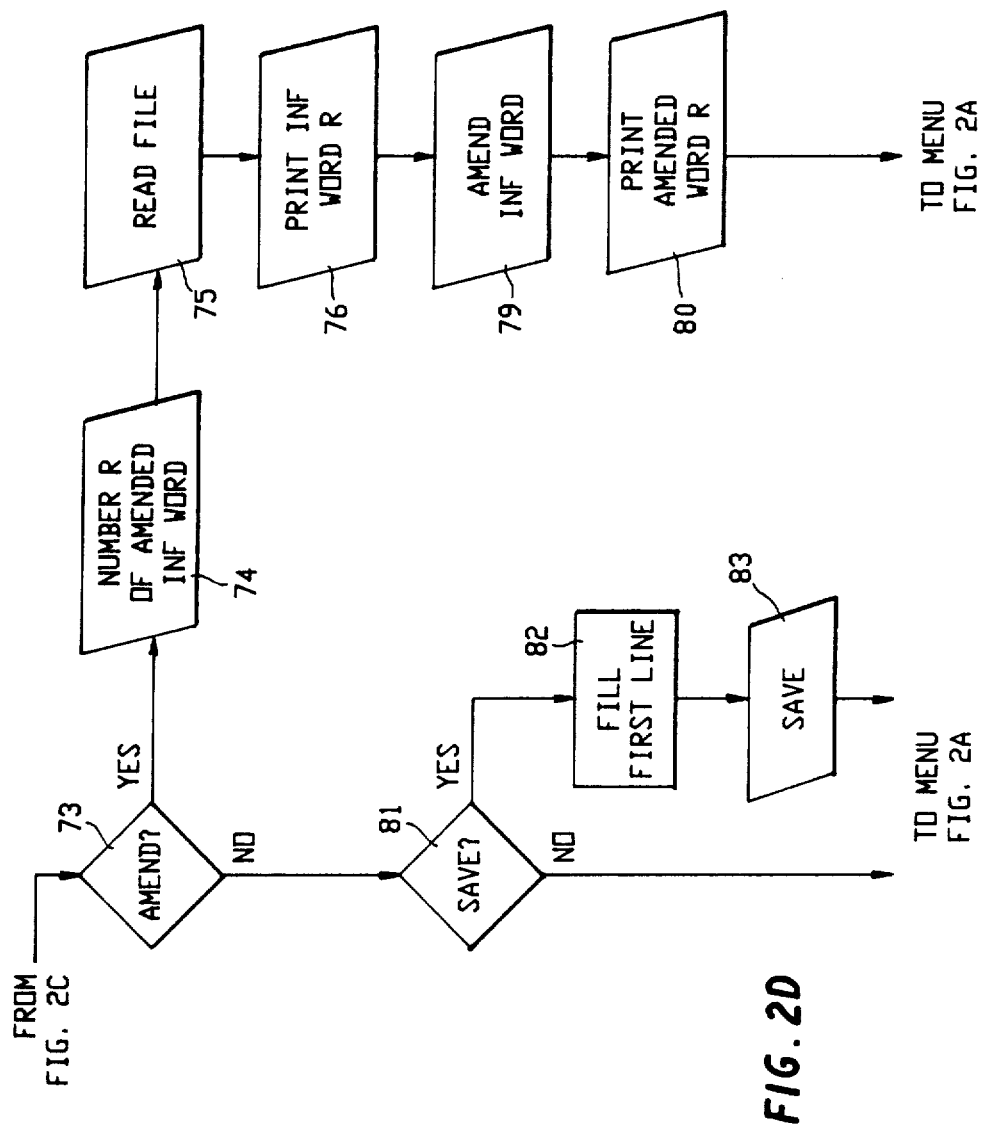

FIG. 1 illustrates still another principle of the present invention. The machine for designing the logical structure of a computer program has an additional input device (14), a key board, for example, through which the attributes of the amended informational words (13) are entered into the processing unit (12). Said processing unit has an algorithm of performing a search of informational words of the parent collection, in order to find and print out on the screen, with the help of the output device (20), all informational words, containing the same numbers of the logical part as the particular one, which is entered as an attribute of the amendment. The program, which controls processing unit, has a structure very close to the one used to get a printout of Documents 2 and 3 (see FIG. 2B). It is the kind of printout which is different; here we consider a screen printout, whereas Documents 2 and 3 and hardcopy printouts. Said printout of informational words helps the designer to verify whether a particular amendment has already been entered into the machine. In order to enter the amendment, said processing unit does the search of informational words finding that particular one which is subject to change. Said particular informational word is printed out with the help of the output device (15). Following the printout, said informational word is substituted in the collection with the amended one, and said amended informational word is also printed out with the help of the output device (15) (see also functional blocks 73–80 in FIG. 2D). The number of the informational word to be amended is inquired in functional block 74. This word is printed out in block 76, after the file is read in block 75. Then said word is amended to block 79 and printed out in block 80. The hardcopy printout of the amended informational words before and after amendment, as well as of the new informational words added to the parent collection, is important as a document describing the history of the logical structure. Said document is called here DOCUMENT 5.

According to another principle of the invention illustrated in FIG. 1 the new daughter collection of informational words, which is created after all amendments are entered into the parent collection, is saved by said processing unit (12) of the machine with the help of the output device (17) in a memory storage device including magnetic tape, disk, etc. In the flow chart of FIG. 2D the saving operation is described by a decision block 81, which transfers control to functional block 82, where the first line of the collection of informational words is filled with the requirements of the file (file number, date, etc.). Control then is transferred to functional block 83, where the daughter file is saved. Said daughter collection of informational words is used to create a new set of hard copy printouts of informational words in numerical order of (1) logical units, (2) subroutines, and (3) program line numbers identifying the entrances of logical parts, said printouts called new DOCUMENTS 2, 3 and 4, and being used to describe the new logical structure of the computer program. The old DOCUMENTS 2, 3 and 4 of the parent collection describing the previous logical structure can now be disposed of, since the previous structure becomes obsolete.

The history of the development of the logical structure is however preserved in the DOCUMENTS 1 and 5 in combination with WORKING DOCUMENTS. Any parent or grandparent set of disposed DOCUMENTS 2, 3 and 4 can, however, be always restored from the corresponding collections saved in a memory storage devices.

Figure 4:
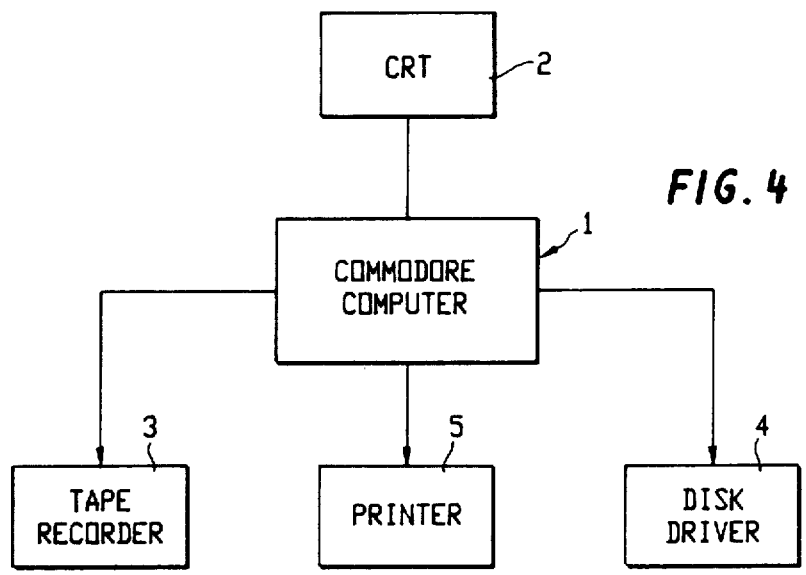
FIG. 4 is a diagrammatic representation of a preferred embodiment of a system for designing the logical structure of a computer program based on a Commodore TM computer.

Returning now to FIG. 4 there are shown schematically elements of one embodiment of the invented system for designing the logical structure of a computer program, based on Commodore TM computer having the memory size at least 16 kilobytes. In this figure, 1 is the Commodore computer VIC-20 with 16 kilobytes Random Excess Memory, 2-cathode ray tube (CRT), which can be either monitor or TV-set, 3-tape recorder, 4-disk drive, 5-printer.

Small operating memory requirement for the system irrespective to the size of the collection of informational words is based on another principle of the present invention. The machine keeps in its operating memory a batch of informational words, containing at least one informational word which was currently created or amended. Said batch is then saved in the memory storage device, being retrieved from the operating memory. Said batch is then entered back into the operating memory during the process of search. The number of informational words in the batch depends on the size of operating memory. The whole collection of informational words becomes therefore a sequence of batches, the number of which depending on the size of the collection rather than on the size of operating memory of the computer.

Any other computer having an operating memory size higher than 16 kilobytes can be also implemented for the invented machine for designing the logical structure of a computer program. Batch size organization of the collection of informational words allows, in this case, to use a rather small portion of computer memory leaving the rest of it to be used for other purposes.

Figure 5:
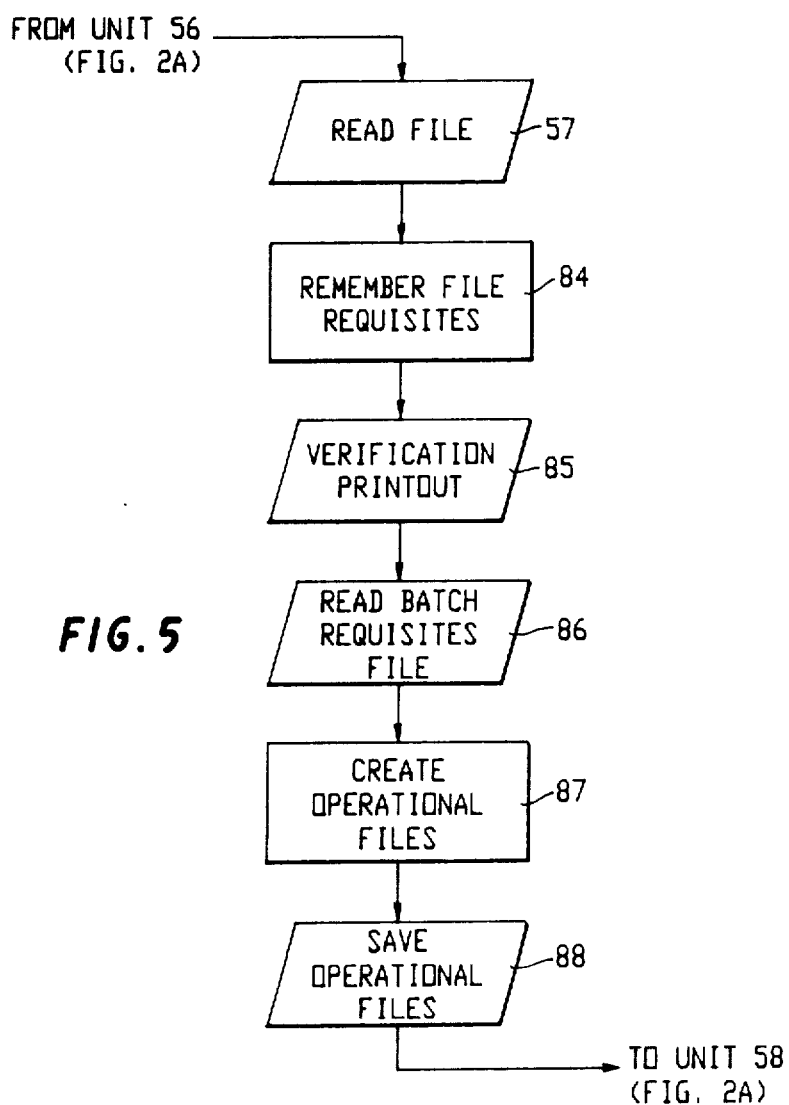
FIG. 5 illustrates implementation of the batch principle according to this invention to the program, controlling processing unit.

FIG. 5 shows an example of implementation of a batch concept to the program controlling the processing unit. The batch variation of the functional block 57 in FIG. 2A consists of a similar functional block 57 in FIG. 3, which reads the first batch. Control is then transferred to the next functional block 84 where the contents of the first line of the collection is remembered. The line contains file requisites (file number, date, etc.), which are printed out in the functional block 85 in order to supply the verification information to the operator. At the next step (functional block 86) an additional informational file is read. This file contains requisites of the system of batches (total number of batches, number of words in each batch, etc.). Then the operational files, exceeding the number of batches by one, are created in functional block 87 and 88. Operational files are loaded with all the batches and are used during the session. When a daughter file is created, the operational files become the source of creation daughter batch files.

What is claimed is:

1. A machine for designing the logical structure of a large computer program, the machine comprising
   (a) an input device (11) capable of entering into processing unit (12) of the machine a collection of informational words (10), numerically describing links between different portions of the computer program, said portions being called "logical parts", each link representing a transfer of control of data processing action from one logical part through its port, said port being called "exit", to the port of another logical part, said port being called "entrance"; each informational word containing at least seven numbers, of which three numbers-a logical part number, an exit number, a program line number of the exit-are attributes of the exit of one logical part, the other three of said seven numbers are attributes of the entrance of the linked logical part, said collection of informational words being called "parent collection";
   (b) said processing unit (12) having an algorithm of memorizing the entered parent collection and performing a search of informational words by the attributes of a logical part;
   (c) an output device (15) providing a hard copy printout of informational words (16) arranged in a consecutive order of the numbers of logical parts.

2. A machine of claim 1, further comprising
   (d) an output device (15) providing a hard copy printout of informational words (16) arranged in a consecutive order of program line numbers corresponding to the entrance of each logical part.

3. A machine of claim 1, further comprising
   (d) an output device (15) providing a hard copy printout of informational words (16) in the order of their location in the collection.

4. A machine of claim 1, further comprising
- (d) another input device (14) capable of entering into the processing unit (12) attributes of the informational words as amendments of the parent collection, said amendments including changes of informational words already present in the collection, as well as creating new informational words added to said collection;
- (e) said processing unit (12) having an algorithm of amending, deleting and creating informational words of the collection according to the entered amendments;
- (f) an output memory storage device (17) for storing amended collection of informational words (18), said collection being called "daughter collection", on magnetic tape, disk and other informational storage means.

5. A machine of claim 4, further comprising
- (g) an output device (19) for screen printout of informational words (20) of the collection having the logical part number which is the same as the one which is present in the entered attributes of an amendment.

6. A machine of claim 4, further comprising
- (g) an output device (15) providing a hard copy printout of the amended informational word of the collection before and after the amendment was made.

7. A method for numerical description of the logical structure of large computer program, the method comprising the steps of
- (a) creating a collection of informational words numerically describing links between different portions of the program, said portions being called "logical parts", each link representing a transfer of control of data processing activity from the exit of one logical part to the entrance of another logical part;
- (b) searching informational words of said collection and making hard copy printouts of informational words in different sequences and combinations, whereby a set of lists is created having the power of substituting conventional graphical description of logical structure of a computer program;
- (c) specifying amendments to be introduced into informational words of said collection after the computer program is modified to the extent that it effects the logical structure;
- (d) introducing said amendments into said collection, whereby a new collection of informational words is created, said new collection being called "daughter collection";
- (e) employing said daughter collection to generate a new set of hard copy printouts of informational words numerically describing the new logical structure of the program.

8. A method of claim 7, further comprising the steps of
- (f) disposing of old set of hard copy printouts of informational words describing previous logical structure;
- (g) keeping a hard copy printout of parent collection of informational words in consecutive order of their locations in the collection, and hard copy of lists of amendments for revision of performed changes.

9. A method for numerical description of the logical structure of a large computer program, the method comprising the steps of
- (a) creating a collection of informational words describing logical links between different portions of the program, said links identifying the transfer of control of data processing activity from one program line belonging to one portion of the program to another program line belonging to another portion of the program;
- (b) identifying all portions of a program, containing at least one program line performing at least one function as "logical parts", and classifying logical parts into two classes: (1) subroutines, (2) logical units; a subroutine being a logical part, which predominately returns control of data processing action back to the program line wherefrom said control was transferred to said subroutine; a logical unit, being a logical part, which eventually transfers the control of data processing action to another logical unit;
- (c) assigning to each logical unit a number belonging to a set of consecutive numbers, and assigning to each subroutine a number belonging to a different set of consecutive numbers;
- (d) considering the first program line of a logical part as a port, said port being called "entrance" of said logical unit;
- (e) considering each program line within a logical part, wherefrom control is transferred to the entrance of another logical part, as a port, said port being called "exit" of said logical part;
- (f) describing links between logical part via informational words stored in the memory as records each of said records having as many fields as many attributes, said attributes are needed to identify two linked logical parts of the program;
- (g) employing no less than three numbers for describing a logical part, said numbers including a logical part number, a program line number, where the port of logical part is located, and the number of the port itself;
- (h) assigning to each informational word a number identifying its location in the collection of informationl words, considering said number as an additional virtual attribute of the informational word;
- (i) saving said parent collection of informational words on a memory storage device, including magnetic tape, disk, etc.

10. A method of claim 9, further comprising the steps of
- (j) performing a search of informational words of said parent collection-whereby a set of printouts of informational words in different sequences and combinations is obtained, said set having the power of describing logical structure of a computer program;
- (k) printing out a list of informational words arranged in consecutive order of the numbers of logical units;
- (l) printing out a list of informational words arranged in consecutive order of the numbers of subroutines;
- (m) printing out a list of informational words arranged in consecutive order of the program line numbers identifying entrances of logical parts;
- (n) printing out a list of all informational words in consecutive order of numbers, identifying the location of informational words in the collection.

11. A method for numerical description of the logical structure of a large computer program, the method comprising the steps of:

(a) specifying amendments to be introduced into informational words of the parent collection after the program is modified to the extent that it effects the logical structure of the program;
(b) introducing said amendments into informational words, and creating a new collection of informational words, said collection being called "daughter" collection;
(c) printing out a list of those informational words which were amended, said list containing a printout of each amended informational words before and after the amendment;
(d) saving the daughter collection of informational words in a memory storage device including magnetic tape, disk, etc.;
(e) using the daughter collection of informational words to create hard copy printouts of informational words in numerical order of (1) logical units, (2) subroutines, (3) program line numbers identifying the entrance of each logical part, whereby said lists of printouts describe the new logical structure of a computer program.

12. A method of claim 11, further comprising the steps of
(f) disposing of the old set of printouts of informational words arranged in the consecutive order of numbers of: (1) logical units, (2) subroutines, (3) line numbers identifying entrances of logical parts;
(g) keeping printouts of informational words in the numerical order of their location in the collection and lists of amendments for revision of performed changes.

13. A method for numerical desription of the logical structure of a large computer program, the method comprising the steps of
(a) providing a scroll organization of the set of informational words arranged in consecutive order by numbers of (1) logical units, (2) subroutines, (3) program line numbers which identify the entrances of logical parts, said scroll being separate from the scroll of the computer program, whereby said scrolls of printouts of informational words complement the scroll of the computer program providing means for easy reading and modifying the program.

14. A method for numerical description of the logical structure of a large computer program, the method comprising the steps of:
(a) providing a loose-leaf organization of the set of hard copy printouts of informationl words arranged in consecutive order of numbers of (1) logical units, (2) subroutines;
(b) employing the loose-leaf organization of said set of hard copy printouts in such a way that informational words belonging to a particular logical part are printed out on at least one separate page;
(c) incorporating the portion of the program, belonging to said particular logical part, into the same page where informational words, belonging to said particular logical part, were printed out;
(d) using the book compiled of loose-leaf pages as a comprehensive description of the computer system comprising the program itself and its logical structure.

15. A method for numerical description of the logical structure of a large computer program, the method comprising the steps of:

(a) defining a "logical part" as a portion of a program, performing at least one function;
(b) defining a "logical unit" as a logical part having one port, called "entrance", through which the control of data processing action is transferred from other logical parts of the program, and at least one other port, said port being called "exit", through which the control of data processing action is eventually transferred to another logical unit;
(c) defining a "subroutine" as a logical part, having an entrance, through which control of data processing action is transferred from other logical parts, said subroutine predominately returning control of data processing action back to the program line wherefrom said control was transferred to said subroutine;
(d) assigning to each logical unit a number belonging to a set of consecutive numbers starting, for example, from 100 and up;
(e) assigning to each subroutine a number which belongs to a set of numbers different from the set of numbers assigned to logical units, said different set of numbers starting, for example, from 500 and up;
(f) assigning to each logical part a preferably short name, which might be describing at least one function of data processing action performed by said logical part;
(g) identifying the entrance of a logical part by the first program line number of the portion of the program, belonging to said part, and assigning to said entrance a number, for example, zero (0);
(h) identifying an exit of a logical part by a program line number, wherefrom the control of data processing action is transferred to a logical part other than said logical part;
(i) identifying each exit of a logical part by a number in numerical order starting from number 1 and up.

16. A method of claim 15, further comprising the steps of
(k) entering into computer a set of at least three attributes, characterizing the exit of one logical part, and a set of at least three attributes, characterizing the entrance of another logical part, to which control of data processing activity is transferred, said attributes consisting of the number of a logical part, the name (optionally) of said logical part, the program line number of the port, the number of the port;
(l) arranging attributes of one logical part and attributes of a linking logical part in such a way that they form an informational word which is stored in a computer memory;
(m) assigning a consecutive memory number to each informational word, said memory number being an additional virtual attribute of each informational word;
(n) forming a collection of all informational words, said collection describing all links between different logical parts, whereby said collection becomes a base for creating a numerical description of the logical structure.

17. A method of claim 16, further comprising the steps of
(p) printing out a list of informational words arranged in consecutive order of memory numbers, said list of informational words being identified by a special name, e.g. Document 1;

(q) printing out a list of informational words arranged in consecutive order of numbers of logical units, said list of informational words being identified by a special name, e.g. Document 2;

(r) printing out a list of informational words arranged in consecutive order of numbers of subroutines, said list of informational words being identified by a special name, e.g. Document 3;

(s) printing out a list of informational words arranged in consecutive order of line numbers of entrances of logical parts, said list of informational words being identified by a special name, e.g. Document 4.

18. A method of numerical description of the logical structure of a large computer program, the method comprising the steps of (a) describing the immediate logical environment of a particular logical part with the help of a numerical description of said particular logic part supplied from the printouts of informational words, said environment description being required whenever the program portion belonging to said particular part is being modified to the extent that it changes the logical structure of the program;

(b) drawing around said particular logical part a program map said map graphically describing links between said particular logical part and other logical parts, each part identified by its number and the number of its location in the collection of informational words, each link being drawn as a line issuing from a particular exit of said particular logical part and ending at the entrance of another logical part, said line containing attributes of the linked parts, said attributes being indicated along the line;

(c) analyzing those links of said particular logical part, which became effected by the modification of the program portion belonging to said particular part, and specifying changes in the program map to be introduced into the logical structure, said changes including amendment, creation, and deletion of said links;

(d) creating a list of amendments of links derived from said program map.

19. A method according to claim 18, further comprising the steps of (e) combining the program map of a particular logical part (1) with the amended portion of the program belonging to said logical part, and (2) with the specification of amendments of informational words, whereby a new document called WORKING DOCUMENT is created in order to complement existing logical structure until the daughter logical structure is created;

(f) introducing amendments from all WORKING DOCUMENTS into parent collection of informational words, and creating a new "daughter" collection of informational words;

(g) printing out a hard copy of the list of all amended informational words before and after amendments, identifying said list of informational words by a special name, e.g. Document 5;

(h) printing out new Documents 2,3 , and 4 based on the amended collection of informational words.

20. A method of claim 19, further comprising the step of (i) disposing of parent Documents 2,3 and 4;

(j) keeping parent collections of informational words which are described in Document 1, and amendments of informational words, which are described in Documents 5, for revision of changes of the program structure.

21. A method of numerical description of the logical structure of a large computer program, the method comprising the step of:

(a) dividing the collection of informational words into separate batches, each batch containing a number of informational words, said number being limited by the size of available operating memory in the computer;

(b) saving each batch in the memory storage device after the informational words, belonging to said batch, were processed;

(c) retrieving said batch of informational words from the operating memory of the computer in order to make room for another batch;

(d) entering said batch into operating memory of the computer from the memory storage device whenever there is a need for processing the informational words, belonging to said batch.

* * * * *